(12) United States Patent
 Omi

(10) Patent No.: US 8,937,626 B2
(45) Date of Patent: Jan. 20, 2015

(54) INFORMATION PROCESSING APPARATUS, INFORMATION PROCESSING SYSTEM, INFORMATION PROCESSING METHOD, AND RECORDING MEDIUM FOR STORING PROGRAM

(75) Inventor: Hiroyuki Omi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 13/498,562

(22) PCT Filed: Sep. 14, 2010

(86) PCT No.: PCT/JP2010/005603
§ 371 (c)(1),
(2), (4) Date: Mar. 27, 2012

(87) PCT Pub. No.: WO2011/039954
PCT Pub. Date: Apr. 7, 2011

(65) Prior Publication Data
US 2012/0182323 A1 Jul. 19, 2012

(30) Foreign Application Priority Data
Sep. 29, 2009 (JP) .................................. 2009-224830

(51) Int. Cl.
| G09G 5/00 | (2006.01) |
| G06K 9/00 | (2006.01) |
| G06K 9/46 | (2006.01) |
| G06K 9/40 | (2006.01) |
| G06K 9/36 | (2006.01) |
| H04N 5/228 | (2006.01) |

(Continued)

(52) U.S. Cl.
CPC *H04N 5/32* (2013.01); *G06T 5/005* (2013.01); *G06T 7/0002* (2013.01); *H04N 5/335* (2013.01); *H04N 5/367* (2013.01); *G06T 2207/10116* (2013.01); *G06T 2207/20021* (2013.01); *G06T 2207/20092* (2013.01); *G06T 2207/30168* (2013.01)
USPC ........ 345/618; 345/606; 345/581; 348/222.1; 348/246; 382/132; 382/194; 382/254; 382/276

(58) Field of Classification Search
USPC .............. 345/418, 428, 581, 589, 600, 606, 345/611–612, 618; 348/222.1, 241, 246, 348/247, 425.1; 358/447–448; 382/132, 382/190, 194, 254, 274, 276, 300
See application file for complete search history.

(56) References Cited

U.S. PATENT DOCUMENTS

| 7,471,321 | B2 * | 12/2008 | Ojima et al. ................... 348/272 |
| 2003/0151686 | A1 * | 8/2003 | Koyama ......................... 348/304 |
| 2005/0104017 | A1 * | 5/2005 | Kimba et al. ............. 250/559.07 |
| 2005/0213801 | A1 * | 9/2005 | Ohara ........................... 382/132 |

(Continued)

FOREIGN PATENT DOCUMENTS

| JP | 1-134272 A | 5/1989 |
| JP | 2001-008928 A | 1/2001 |
| JP | 2009-049527 A | 3/2009 |

*Primary Examiner* — Wesner Sajous
(74) *Attorney, Agent, or Firm* — Canon U.S.A., Inc. IP Division

(57) ABSTRACT

An information processing apparatus includes a determination unit configured to determine whether or not a region having at least one pixel of an image includes a predetermined number of anomalous pixels, and a creation unit configured to create information indicating the determination result for the region.

15 Claims, 21 Drawing Sheets

(51) Int. Cl.
*H04N 9/64* (2006.01)
*H04N 5/32* (2006.01)
*G06T 5/00* (2006.01)
*G06T 7/00* (2006.01)
*H04N 5/335* (2011.01)
*H04N 5/367* (2011.01)

(56) References Cited

U.S. PATENT DOCUMENTS

2006/0237628 A1* 10/2006 Moody et al. .............. 250/208.1
2008/0218610 A1* 9/2008 Chapman et al. ............ 348/246
2009/0141152 A1* 6/2009 Ojima et al. ................. 348/273

* cited by examiner

Fig. 2B

209 STORAGE UNIT

- IMAGE INFORMATION INDICATING DEFECTIVE PIXEL POSITION BEFORE REDUCTION
- IMAGE INFORMATION INDICATING DEFECTIVE PIXEL POSITION AFTER REDUCTION
- INPUT REDUCTION RATIO
- THRESHOLD OF DEFECTIVE PIXEL

DEFECTIVE PIXEL MAP AFTER REDUCTION
(REDUCTION RATIO 0.5, THRESHOLD 1)

| PIXEL POSITION | PIXEL VALUE | PIXEL POSITION | PIXEL VALUE |
|---|---|---|---|
| (0,0) | 0 | (3,2) | 0 |
| (1,0) | 1 | (4,2) | 0 |
| (2,0) | 0 | (0,3) | 1 |
| (3,0) | 0 | (1,3) | 0 |
| (4,0) | 0 | (2,3) | 0 |
| (0,1) | 0 | (3,3) | 1 |
| (1,1) | 0 | (4,3) | 0 |
| (2,1) | 0 | (0,4) | 0 |
| (3,1) | 0 | (1,4) | 0 |
| (4,1) | 1 | (2,4) | 0 |
| (0,2) | 0 | (3,4) | 0 |
| (1,2) | 0 | (4,4) | 0 |
| (2,2) | 0 | | |

Fig. 4C
DISPLAY EXAMPLE OF DEFECTIVE
PIXEL MAP AFTER REDUCTION
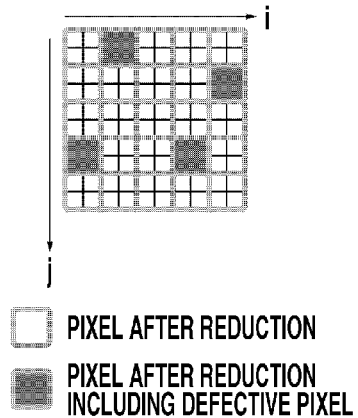
☐ PIXEL AFTER REDUCTION
▓ PIXEL AFTER REDUCTION
   INCLUDING DEFECTIVE PIXEL
Fig. 4D
DEFECTIVE PIXEL MAP AFTER REDUCTION
(REDUCTION RATIO 0.4, THRESHOLD 40%)
| PIXEL POSITION | PIXEL VALUE | PIXEL POSITION | PIXEL VALUE |
|---|---|---|---|
| (0,0) | 0 | (0,2) | 0 |
| (1,0) | 1 | (1,2) | 0 |
| (2,0) | 0 | (2,2) | 0 |
| (3,0) | 0 | (3,2) | 0 |
| (0,1) | 0 | (0,3) | 0 |
| (1,1) | 0 | (1,3) | 0 |
| (2,1) | 0 | (2,3) | 0 |
| (2,2) | 0 | (3,3) | 0 |
Fig. 4E
DISPLAY EXAMPLE OF DEFECTIVE
PIXEL MAP AFTER REDUCTION
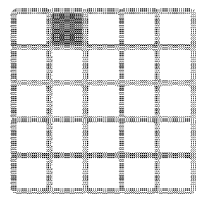

DEFECTIVE PIXEL MAP AFTER REDUCTION
(REDUCTION RATIO 0.5)

| PIXEL POSITION | PIXEL VALUE | PIXEL POSITION | PIXEL VALUE |
|---|---|---|---|
| (0,0) | 1 | (3,2) | 0 |
| (1,0) | 0 | (4,2) | 0 |
| (2,0) | 0 | (0,3) | 0 |
| (3,0) | 0 | (1,3) | 0 |
| (4,0) | 0 | (2,3) | 0 |
| (0,1) | 0 | (3,3) | 4 |
| (1,1) | 0 | (4,3) | 0 |
| (2,1) | 0 | (0,4) | 0 |
| (3,1) | 0 | (1,4) | 0 |
| (4,1) | 0 | (2,4) | 0 |
| (0,2) | 0 | (3,4) | 0 |
| (1,2) | 0 | (4,4) | 0 |
| (2,2) | 3 | | |

DISPLAY EXAMPLE OF DEFECTIVE
PIXEL MAP AFTER REDUCTION
(DISPLAY FUNCTION Fa)

DEFECTIVE PIXEL MAP AFTER REDUCTION
(REDUCTION RATIO 0.4)

| PIXEL POSITION | PIXEL VALUE | PIXEL POSITION | PIXEL VALUE |
|---|---|---|---|
| (0,0) | 1 | (0,2) | 0 |
| (1,0) | 0 | (1,2) | 0 |
| (2,0) | 0 | (2,2) | 3.25 |
| (3,0) | 0 | (3,2) | 0.75 |
| (0,1) | 0 | (0,3) | 0 |
| (1,1) | 1 | (1,3) | 0 |
| (2,1) | 1 | (2,3) | 0.75 |
| (3,1) | 0 | (3,3) | 0.25 |

DISPLAY EXAMPLE OF DEFECTIVE
PIXEL MAP AFTER REDUCTION
(DISPLAY FUNCTION Fb)

DEFECTIVE PIXEL MAP AFTER REDUCTION

INFORMATION AFTER REDUCTION WITH AVERAGE

| PIXEL POSITION | PIXEL VALUE | PIXEL POSITION | PIXEL VALUE |
|---|---|---|---|
| (0,0) | 0 | (3,2) | 0 |
| (1,0) | 0.5 | (4,2) | 0 |
| (2,0) | 0 | (0,3) | 0.25 |
| (3,0) | 0 | (1,3) | 0 |
| (4,0) | 0 | (2,3) | 0 |
| (0,1) | 0 | (3,3) | 0.25 |
| (1,1) | 0 | (4,3) | 0 |
| (2,1) | 0 | (0,4) | 0 |
| (3,1) | 0 | (1,4) | 0 |
| (4,1) | 0.25 | (2,4) | 0 |
| (0,2) | 0 | (3,4) | 0 |
| (1,2) | 0 | (4,4) | 0 |
| (2,2) | 0 | | |

IMAGE INFORMATION AFTER BINARIZATION PROCESSING

| PIXEL POSITION | PIXEL VALUE | PIXEL POSITION | PIXEL VALUE |
|---|---|---|---|
| (0,0) | 0 | (3,2) | 0 |
| (1,0) | 1 | (4,2) | 0 |
| (2,0) | 0 | (0,3) | 1 |
| (3,0) | 0 | (1,3) | 0 |
| (4,0) | 0 | (2,3) | 0 |
| (0,1) | 0 | (3,3) | 1 |
| (1,1) | 0 | (4,3) | 0 |
| (2,1) | 0 | (0,4) | 0 |
| (3,1) | 0 | (1,4) | 0 |
| (4,1) | 1 | (2,4) | 0 |
| (0,2) | 0 | (3,4) | 0 |
| (1,2) | 0 | (4,4) | 0 |
| (2,2) | 0 | | |

DEFECTIVE PIXEL MAP AFTER REDUCTION

INFORMATION PROCESSING APPARATUS, INFORMATION PROCESSING SYSTEM, INFORMATION PROCESSING METHOD, AND RECORDING MEDIUM FOR STORING PROGRAM

TECHNICAL FIELD

The present invention relates to an information processing apparatus, an information processing system, and an information processing method, which display an anomalous pixel, and a recording medium for storing a program that causes a computer to execute the information processing method.

BACKGROUND ART

A digital image obtained by an imaging apparatus includes a plurality of pixels. Color and density expressed by the pixels creates the entire image. There can be a pixel called an anomalous pixel among the plurality of pixels.

The anomalous pixel means a defective pixel outputting a signal that departs from a predetermined output range with respect to a predetermined input due to an abnormal condition of a circuit or a device in the imaging apparatus, or a pixel outputting another abnormal signal or a defective value.

Since the anomalous pixel influences the image quality of a captured image, the anomalous image is corrected with a replacement method using an average pixel value of pixels around the anomalous pixel and an image after the correction is provided to a user.

A medical field demands checking the position of an anomalous pixel subjected to correction processing. Because the correction processing changes a pixel value of the anomalous pixel and an image before the correction thus needs to be checked at the position of the anomalous pixel.

With a conventional technology for meeting the demand, a radiographic image is related to the position of the anomalous pixel, and the position of the anomalous pixel is superimposed to the entire radiographic image and is then displayed.

The check of the anomalous pixel includes that of the presence or absence of the anomalous pixels and whether or not a number of the anomalous pixels in a predetermined region exceeds a predetermined threshold. However, only the display operation of the defective pixel cannot realize acquisition of the information.

SUMMARY OF INVENTION

The present invention is directed to an information processing apparatus, an information processing system, an information processing method capable of indicating the presence or absence of an anomalous pixel on the unit basis of a region having a plurality of pixels.

According to an aspect of the present invention, an information processing apparatus includes determination unit configured to determine whether or not an individual region having a plurality of pixels in an image includes a predetermined number of anomalous pixels, and creation unit configured to create information indicating the determination result for each of the individual region.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 2B illustrates information stored in a storage unit 209.

FIG. 4C illustrates created information and a display example thereof according to the first exemplary embodiment.

FIG. 4D illustrates created information and a display example thereof according to the first exemplary embodiment.

FIG. 4E illustrates created information and a display example thereof according to the first exemplary embodiment.

DESCRIPTION OF EMBODIMENTS

Various exemplary embodiments, features, and aspects of the invention will be described in detail below with reference to the drawings.

According to the present invention, an anomalous pixel means an abnormal or output-defective pixel, i.e., a pixel having a value exceedingly out-of pixel values therearound. The anomalous pixel is specified by dividing an image into predetermined regions and setting, as the anomalous pixel, a pixel whose value deviates from an average pixel value of pixels in the divided region by more than a predetermined multiple of the standard deviate.

An example of the anomalous pixel, i.e., a defective pixel generated by an abnormal condition of a device or a circuit is described below according to the exemplary embodiments.

Example 1

An X-ray imaging system according to a first exemplary embodiment functions as an information processing system that creates reduced image information while partly storing image information indicating a defective pixel position of an image captured by a detector 101 with an information processing apparatus 102 when displaying the image information indicating the defective pixel position.

Figure 1:
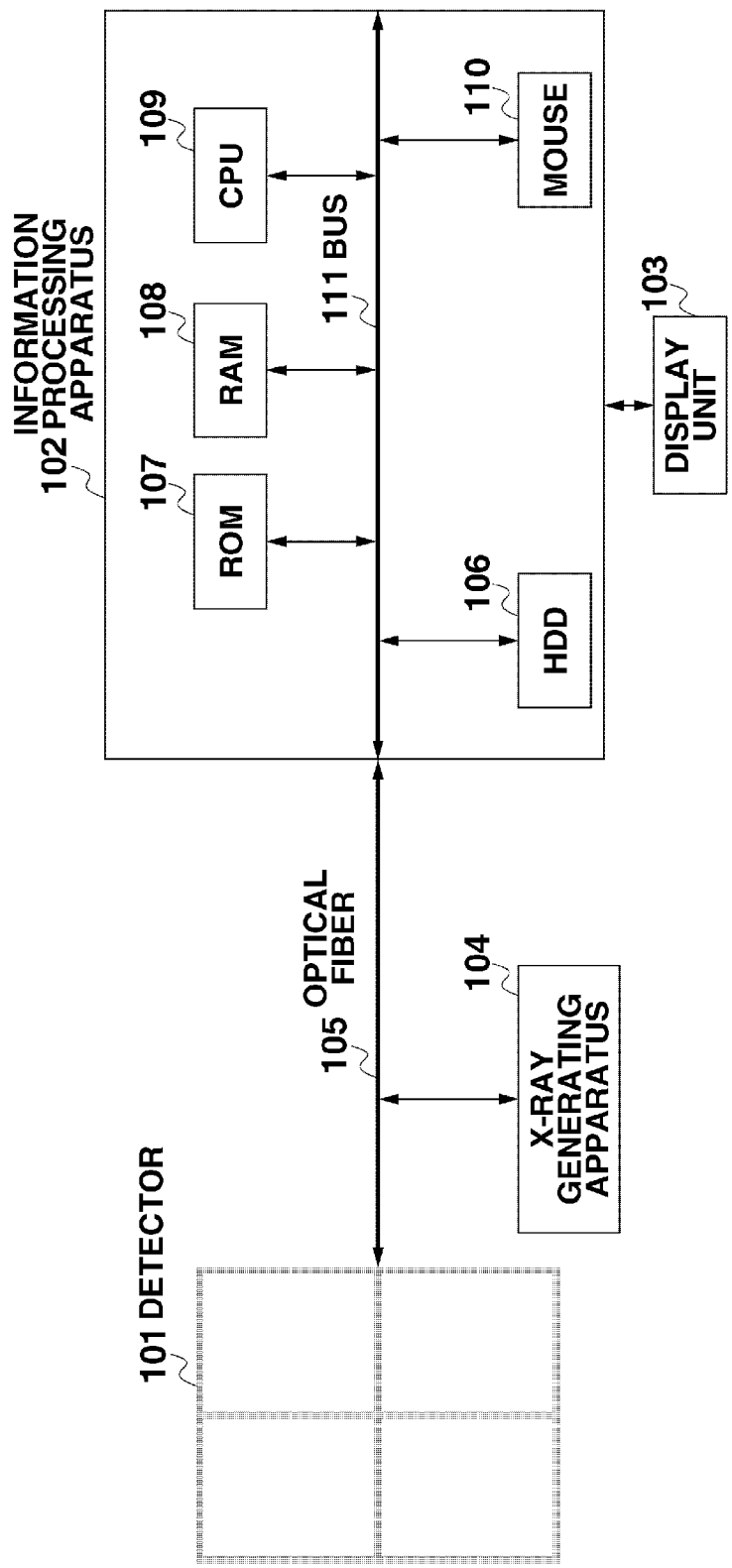
FIG. 1 illustrates a configuration of an X-ray imaging system.
Figure 2A:
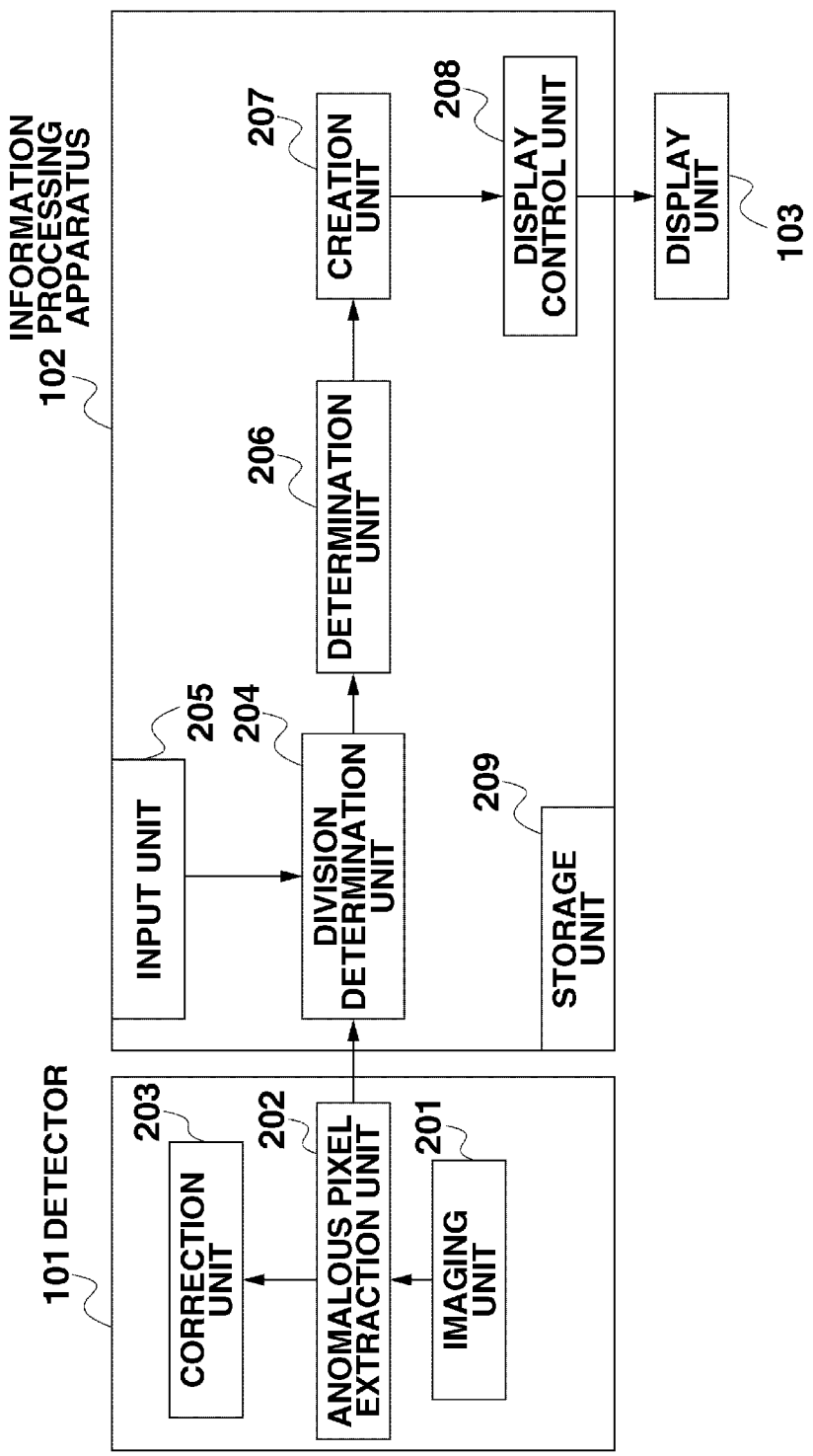
FIG. 2A is a block diagram illustrating functions realized by the X-ray imaging system and a relation therebetween.
Figure 3A:
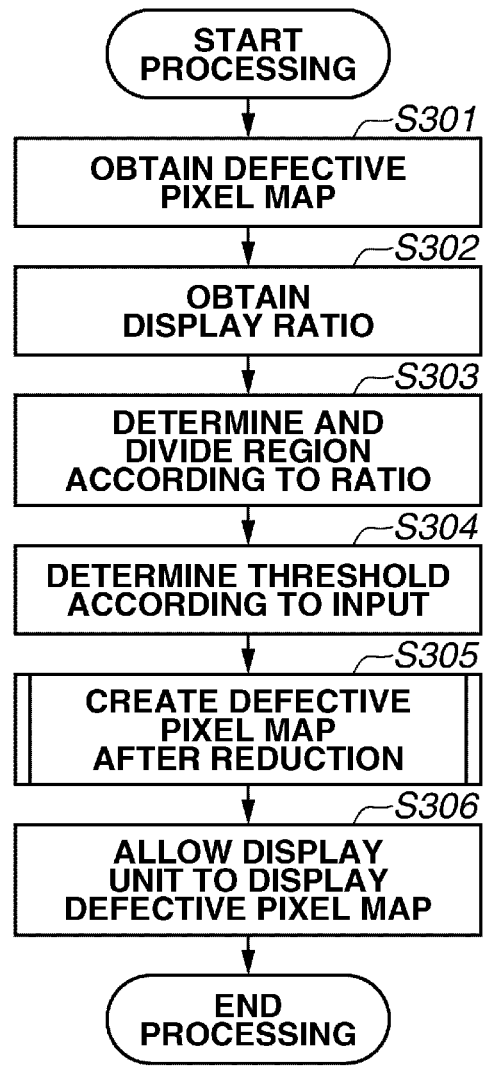
FIG. 3A is a flowchart illustrating a flow of processing according to a first exemplary embodiment of the present invention.
Figure 3B:
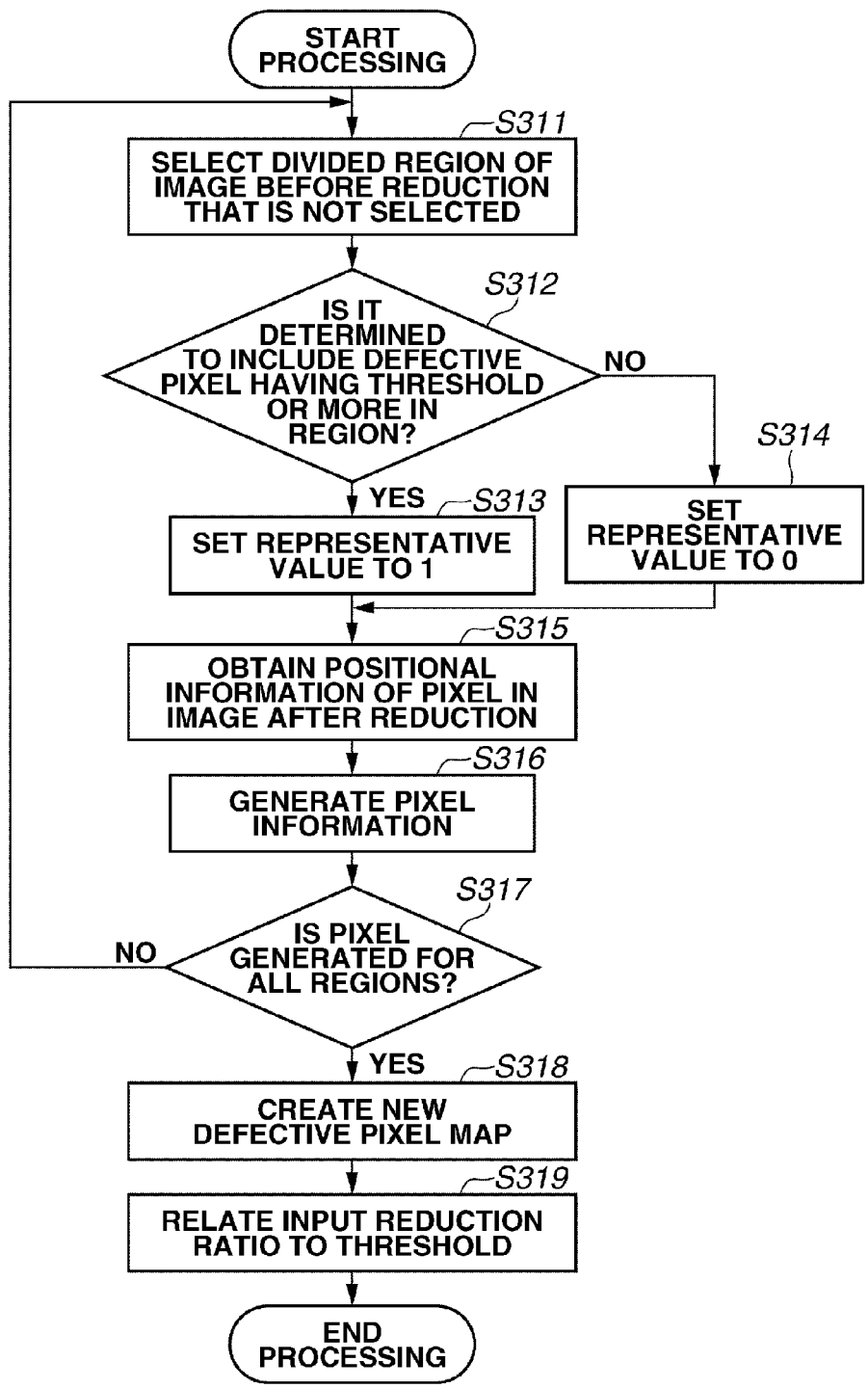
FIG. 3B is a flowchart illustrating a flow of processing according to a first exemplary embodiment of the present invention.

FIG. 1 illustrates a configuration of the X-ray imaging system. FIGS. 2A and 2B are block diagrams illustrating functions realized by the detector 101 and the information processing apparatus 102. FIGS. 3A and 3B are flowcharts illustrating a flow of processing of the information processing apparatus 102. FIGS. 4A to 4E illustrate created image information and display examples thereof.

The configuration of the X-ray imaging system illustrated in FIG. 1 is described. In the X-ray imaging system, the information processing apparatus 102 receives the image captured by the detector 101 and performs predetermined processing of the image, and a display unit 103 displays the processed image. An X-ray generation device 104 irradiates a subject with generated X rays, and the detector 101 detects the X-rays synchronously with the irradiation and obtains a subject image.

The information processing apparatus 102 obtains the subject image via an optical fiber 105 as a signal line and stores the image to a storage region in a hard disk drive (HDD) 106, and the display unit 103 such as a liquid crystal display displays the image.

The information processing apparatus 102 includes the HDD 106, a read-only memory (ROM) 107, a random access memory (RAM) 108, a central processing unit (CPU) 109, and a mouse 110, and the components are connected to each other via a bus 111. The HDD 106 stores necessary information, e.g., the image obtained from the detector 101 or the position of the defective pixel.

The ROM 107 realizes the functions illustrated in FIGS. 2A and 2B, and stores a computer program for allowing the information processing apparatus 102 to execute processing illustrated in FIGS. 3A and 3B. The computer program is read to the RAM 108, and the CPU 109 executes the read program. Thus, the cooperation between the information processing apparatus 102 and the computer program realizes the functions in FIGS. 2A and 2B, and the display processing in FIGS. 3A and 3B.

The function of the detector 101 and the functions realized by the information processing apparatus 102 in cooperation with the computer program are described in detail with reference to FIGS. 2A and 2B.

An imaging unit 201 in the detector 101 detects the X rays transmitted through the subject, converts the X rays into charges, and stores the charges. Further, the charges are read out from the imaging unit 201 as an electrical signal. With processing such as AD conversion, offset correction, gain correction, or correction of the defective pixel, the imaging unit 201 forms the subject image. A detector may detect radiation rays, not limited to the X-rays, irradiated to the subject, and convert the received radiation rays into an electrical signal.

An anomalous pixel extraction unit 202 extracts a defective pixel of the image. The anomalous pixel extraction unit 202 stores the extracted defective pixel to a storage unit (not illustrated) in the detector 101. Positional information of the obtained defective pixel corresponds to image information indicating the position of the defective pixel in the entire image. For example, the positional information is bitmap data (hereinafter, referred to as a defective pixel map) with a defective pixel being expressed as 1 and a normal pixel as 0.

The defective pixel map is not limited to the bitmap data format, and can take different forms depending on purposes. An image used for extracting the defective pixel is called a white image that is obtained by irradiating a sensor with X rays having uniform intensity.

As a method for extracting the defective pixel from the image, the image is divided into predetermined regions, and the pixel, which has a value apart from a pixel average of the predetermined regions by a predetermined multiple or more of the standard deviate, is determined as a defective pixel. The pixel extracted according to the method is defined, similar to the anomalous pixel. In this viewpoint, the X-ray imaging system can be easily applied to the anomalous pixel other than the defective pixel.

A correction unit 203 corrects the defective pixels of the image with the extracted defective pixel map to obtain a corrected image. The defective pixel is corrected by replacing a pixel value of the defective pixel with an average of four neighboring pixels.

A division determination unit 204 in the information processing apparatus 102 obtains the positional information of the defective pixel extracted by the anomalous pixel extraction unit 202, and divides the obtained information into predetermined rectangular regions. The division determination unit 204 determines the size of the divided region depending on a reduction ratio input to an input unit 205 with user's mouse operation.

A reduction ratio KDisp is a real number ranging between 0 and 1. When the original image is rectangular, the reduction ratio KDisp indicates a ratio of a one-side length of a display image to a one-side length of the original image. When the reduction ratio KDisp is 0.5, the total four pixels having two pixels in the individual horizontal and vertical directions are determined using a reciprocal of 0.5 as a rectangular region for division, and the division operation is executed.

The ratios in the horizontal and vertical directions may be individually set. Although the division targets are regions without the overlap to each other, the present invention is not limited to this, and the division may be performed including the overlapped regions.

The input unit 205 includes a mouse, and receives an input for designating a reduction ratio that reduces the defective pixel map. The X-ray imaging system may designate the reduction ratio. Information on a reduction ratio KIn designated by the user or system is sent to the division determination unit 204 and the storage unit 209. The division determination unit 204 calculates an image size (ImgX, ImgY) of the image after the correction for display, a display size (OutX, OutY) on a monitor, and the actual reduction ratio KDisp on the monitor. If the ratios in the horizontal and vertical directions are different from each other, a smaller ratio is selected.

Equation (1)

$$KDisp = \text{Min}\left[KIn \cdot \left(\frac{OutX}{ImgX}\right), KIn \cdot \left(\frac{OutY}{ImgY}\right)\right]$$ [Math. 1]

The input unit 205 receives an input of an allowable number of the defective pixels or a threshold of the defective pixels of the individual regions divided by the division determination unit 204. The threshold may be set by user designation or may be set in advance as a preset value at the shipment time. As for a method for setting the threshold, the threshold may be designated as a numerical value.

The storage unit 209 stores the values. In addition, the number density of the defective pixels in the divided region may be designated. For example, when 1% is designated as the number density, it can be determined whether or not the region includes 1% or more of the defective pixels.

For the individual regions divided by the division determination unit 204, the determination unit 206 determines whether or not the region includes a predetermined number or more of the defective pixels. The predetermined number is determined depending on the threshold or the number density input by the input unit 205, and the number of pixels included in the divided region.

The determination unit 206 refers to the defective pixel map obtained from the storage unit (not illustrated) in the detector 101 for the determination. When the threshold is 1, the determination unit 206 determines whether or not the region includes at least one defective pixel, in other words, whether the defective pixel is present or absent.

If the region includes a part of one pixel, i.e., if one pixel exists across a plurality of regions, when the region includes a part of the defective pixel, the determination unit 206 determines that there are a number, which can be a value other than an integer, of the defective pixels in the included part.

When the defective pixel is present across two or more regions, the determination unit 206 may determine that the defective pixel is included in the region including the largest part of the defective pixel and is not included in another region.

A creation unit 207 creates a reduction map indicating a determination result of the determination unit 206 for each predetermined region, and stores the created reduction map in the storage unit 209. The pixel information is created according to the determination result of the defective pixel in the region by the determination unit 206. The pixel information has a format, e.g., the following Table 1.

TABLE 1

| Data Name | Format |
| --- | --- |
| Pixel Position | 2-dimensional Coordinate (i, j) |
| Representative Value | 1, 0 |

The position of the pixel indicates that of the pixel after the reduction in the defective pixel map after the reduction. A representative value is data indicating whether or not the region divided by the division determination unit 204 includes a predetermined number or more of the defective pixels.

When the determination result of the determination unit 206 has a predetermined number or more of the defective pixels in the region, the data is 1. When the determination result does not have a predetermined number or more of the defective pixels in the region, the data is 0.

In the case of the pixel information corresponding to the region including a predetermined number or more of the defective pixels, a value thereof is inevitably 1. The storage unit 209 therefore stores information indicating whether or not the region includes a predetermined number or more of the defective pixels in the original defective pixel map. Irrespective of the reduction ratio, the storage unit 209 stores the information indicating whether or not the region includes a predetermined number or more of the defective pixels. The creation unit 207 creates the pixel information for all divided regions.

With the created pixel information, the creation unit 207 reconstructs the defective pixel map. The map created with the reconstruction is a reduced defective pixel map indicating whether or not each divided region includes a predetermined number of the defective pixels in the defective pixel map obtained from the detector 101.

The reduction means that the size of the defective pixel map displayed as an image is smaller than that before the reduction, and that the amount of information of the defective pixel map is smaller than that before the reduction.

The display control unit 208 controls an operation for obtaining the created map after the reduction from the creation unit 207 or the storage unit 209 and displaying the obtained map on the display unit 103. Specifically, the display control unit 208 allows the display unit 103 to continue the display operation until receiving an input for changing the display operation.

The display control unit 208 also controls the display operation with a display luminance corresponding to the pixel value of the pixel information on the pixel after the reduction that constructs the map after the reduction. The display luminance indicates a luminance value when displaying the data. When the region includes a predetermined number or more of the defective pixels, the display luminance is 0 (black). When the region does not include a predetermined number or more of the defective pixels, the display luminance is 255 (white).

The storage unit 209 includes the HDD 106, and stores the defective pixel map obtained from the detector 101. Further, the storage unit 209 stores the defective pixel map after the reduction created by the creation unit 207. In addition, the storage unit 209 stores the image information and the reduction ratio input from the input unit 205 after the association therebetween. When storing the reduction ratio to a header portion of the image information, the storage unit 209 also can store the reduction ratio and the defective pixel map after the reduction with the association therebetween.

A processing flow executed by the information processing apparatus 102 with the above configuration is described with reference to FIGS. 3A and 3B. The information processing apparatus 102 performs the processing using hardware resources in the information processing apparatus 102 and a program, which is read and executed by the CPU 109. For convenience of the description, functional blocks in FIG. 2A realized by the hardware and software in corporation are mainly described.

In step S301, the division determination unit 204 obtains the defective pixel map from the detector 101. The division determination unit 204 may obtain the map in response to an input for instructing the creation of the map after the reduction or the input from the input unit 205.

In step S302, the division determination unit 204 obtains the reduction ratio designated by a user with the input unit 205. In step S303, the division determination unit 204 determines the division region according to the reduction ratio, and divides the defective pixel map for each predetermined region based on the determined region. The region for dividing the image information is defined from the reciprocal of the reduction ratio, and the region is divided on the image (the origin of coordinates).

In this case, data is created to hold a point on the upper left in the region, and the storage unit 209 stores the division data and the reduction ratio associated with the image information. In step S304, the threshold is designated according to information for designating the threshold input by the input unit 205. The storage unit 209 stores the threshold.

In step S305, the determination unit 206 and the creation unit 207 create the reduced defective pixel map. In step S305, the determination unit 206 determines whether or not the division region includes a predetermined number or more of the defective pixels to select the representative value for the individual regions according to the determination result, and the creation unit 207 creates the defective pixel map after the reduction based on the representative value.

The processing is described later with reference to FIG. 3B. After creating the map after the reduction, in step S306, the display control unit 208 allows the display operation of the display unit 103 according to the value of the pixel information constructing the created defective pixel map after the reduction, thereby displaying a screen described below.

According to the present exemplary embodiment, a first display pattern with a luminance of 0 displays the pixel after the reduction having a value of 1, and a second display pattern with a luminance of 255 displays another pixel. The image after the reduction constructed by the pixel after the reduction generated according to the determination displays information indicating whether or not the region includes a predetermined number or more of the defective pixels.

By displaying the defective pixel map after the reduction created from the pixel information generated according to the determination of the defective pixel, a small screen region can display whether or not the region includes a predetermined number or more of the defective pixels apparently.

In particular, with processing for determining the number of the defective pixels, the creation unit 207 creates the map after the reduction by using a desired number of the defective pixels as the threshold. As a consequence, information on the defective pixel is displayed according to various purposes.

A predetermined number is set as 1, thereby creating and displaying the reduced defective pixel map while storing information indicating the presence or absence of the defective pixel. By generating the defective pixel according to the designation of the number density, the reduced defective pixel map is created and displayed while storing the information indicating whether or not the region includes a predetermined ratio or more of the defective pixels.

FIG. 3B is a flowchart illustrating details of processing for generating the pixel information in step S305.

In step S311, the determination unit 206 selects and obtains the divided region of the image before the reduction that is not selected by referring to the divided data and the defective pixel map. In step S312, the determination unit 206 sequentially determines, by referring to the calculated number of the defective pixels, whether or not the pixels in the region include a predetermined number or more of the defective pixels.

In the processing, the number of the defective pixels in the region is sequentially counted and reaches the threshold, the calculation is then ended, and the determination is executed. Compared with the case where the calculation and determination of all the defective pixels in the region are performed, the processing time is reduced.

When the determination unit 206 counts all the defective pixels in the region and the number of defective pixels in the region then does not reach the threshold (NO in step S312), the processing proceeds to step S314. The number of the defective pixels can be not only an integer but also a real number. When the number of the defective pixels is not the integer, one region includes a part of one pixel, which is the defective pixel. When the region corresponding to the division includes a part of one defective pixel, the determination unit 206 determines the number of the defective pixels based on a part of the defective pixel.

When the determination unit 206 determines that the number of the defective pixels in the region is a predetermined number or more (YES in step S312), in step S313, the representative value is set as 1. When the number of the defective pixels in the region is a predetermined number or more (NO in step S312), in step S314, the representative value is set as 0. In this case, the representative value may not be generated, and it is possible to reduce the amount of data of the entire created defective pixel map. After ending the determination in step S304 for all regions, in step S305, the pixel may be created.

In step S315, the positional information of the pixel in the defective pixel map after the reduction is then obtained using a point of the coordinate of the division data and the reduction ratio. With the above processing, the operation ends to obtain the information necessary for one divided region before the reduction.

In step S316, the creation unit 207 secures the region for storing data in the format illustrated in Table 1, and generates the pixel information. In step S317, the CPU 109 determines whether or not the creation unit 207 generates the pixel information for all regions after the creation. When the creation unit 207 does not generate the pixel information for all regions (NO in step S317), the processing returns to step S311, and the processing is applied to the next region. The same processing is repeated, thereby creating the pixel information to the entire image information.

In step S317, the creation unit 207 reconstructs the generated pixel information to create a new defective pixel map. The creation unit 207 sequentially creates data in order of coordinate values by referring to the coordinate value of the generated pixel information. In step S318, the creation unit 207 finally relates the reduction ratio and the threshold to the created defective pixel map.

As a relating form, the reduction ratio and the threshold may be stored to a header portion of the defective pixel map as bibliographic information. Alternatively, the defective pixel map, the reduction ratio, and the threshold may be mutually referred to.

The processing enables the creation of the information indicating the position of the defective pixel that stores the information indicating whether or not the region includes a predetermined number of the defective pixels. The created defective pixel map after the reduction is reduced in the entire amount of the information, as compared with the defective pixel map before the reduction. However, the input unit 205 changes the threshold to present information corresponding to a purpose of a person who checks the defective pixel.

Figures 4A, 4B:
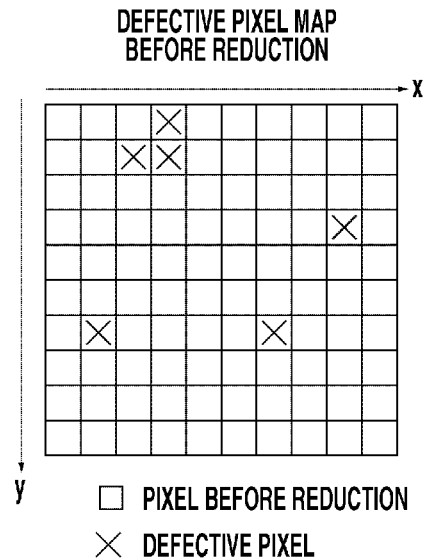
FIG. 4A illustrates created information and a display example thereof according to the first exemplary embodiment.
FIG. 4B illustrates created information and a display example thereof according to the first exemplary embodiment.

FIGS. 4A to 4E illustrate the image information created with the above-described processing and display examples thereof. FIG. 4A illustrates the defective pixel map before the reduction. Each square indicates a pixel, and the pixel added with a mark "x" is the defective pixel.

FIG. 4B is a table of the image information after the reduction when the reduction ratio is 0.5 and the threshold of the number of the defective pixels is 1. Since the reduction ratio is 0.5, one pixel after the reduction is a rectangular region containing the total 4 pixels of 2 pixels in the individual vertical and horizontal directions.

The defective pixel map before the reduction is divided for each region containing the 4 pixels. If the pixel before the reduction for forming the pixel after the reduction includes at least one defective pixel, the number of the defective pixels is 1, and if not so, the number of the defective pixels is 0. Because the information indicating the presence or absence of the defective pixel with respect to a relationship between the data and the original defective pixel map is stored, the reference to the data enables prevention of erroneous determination as the presence or absence of the defective pixel.

FIG. 4C illustrates a display example of the defective pixel map after the reduction when the reduction ratio is 0.5. The display control unit 208 controls the display operation with the first display pattern with coloring of the pixel after the reduction that includes the defective pixel, and the second display pattern without coloring of the pixel after the reduction that does not include the defective pixel. A dotted line in FIG. 4C is used for the purpose of an easy description of a relation of the condition after/before the reduction, and may not be displayed.

FIG. 4D illustrates the image information when the reduction ratio is 0.4 and the threshold of the number of the defective pixels is 40%. In this case, one pixel after the reduction includes the total 6.25 pixels before the reduction containing 2.5 pixels in the individual vertical and horizontal directions.

Since the threshold is determined by the number density of the defective pixels in the region, the pixel value is 1 when the region includes 2.5 or more defective pixels as a number obtained by multiplying the threshold to the number of the pixels before the reduction in the region, and the pixel value is 0 when the region includes less than 2.5 defective pixels in the region.

FIG. 4E illustrates a display example of the defective pixel map after the reduction in the region. There are 2.5 defective pixels included in the region before the reduction corresponding to the pixel after the reduction at the position (1, 1) in the image after the reduction, and the defective pixels are thus displayed with the first display pattern with which the display luminance is reduced to be dark. Other pixels after the reduction are displayed with the second display pattern having the highest value of the display luminance.

The presence or absence of the defective pixel is checked by reducing and displaying the image while storing the information on the presence or absence of the defective pixel in the original defective pixel map. Even when the image has pixels over the number of display pixels on the display unit, it is possible to schematically inform about the position of the defective pixel without requesting a complicated operation to the user.

In addition, the first and second display patterns can be any other patterns, such as flickering/unflickering, with/without character information, and with different character information. The present invention can be realized if the first and second display patterns are different.

The above-described display operation enables the presentation of the reduced defective pixel map. Especially, with the increase in number of pixels of the image as a result of recent high resolution of the image, the number of the defective pixels may exceed the number of pixels of the display unit in many cases.

When displaying the position of the defective pixel corresponding to the image, one screen cannot display the position of the defective pixel in the entire image once. The complicated display operation such as the change in display position may be required.

If reducing the image with a well-known image reduction method, such as a bilinear method or a bicubic method, the creation of the image after the reduction reflecting the defective pixel may not be assured. If the image after the reduction reflects the defective pixel, the defective pixel is not determined and the position of the defective pixel is not therefore easily confirmed when increasing the reduction ratio.

According to the present exemplary embodiment, the map after the reduction is properly created according to the screen size, significantly, one screen enables the check of the position of the defective pixels without the complex operation such as a movement of the display position.

In the display operation, the display unit 103 may enlarge and display the defective pixel map after the reduction. In this case, since one pixel on the display unit 103 is enlarged, the position of the defective pixel is more easily checked. In particular, the defective pixel appears as one pixel or a group of several pixels, and can be missed because of the smallness thereof on the screen.

With the display operation illustrated in FIG. 4C or FIG. 4E, when one region includes the defective pixel, the pixel is created corresponding to the defective pixel. Therefore, with the created image information, the position of the defective pixel can be displayed to confirm easily.

Example 2

According to the second exemplary embodiment, the storage unit 209 stores the number of defective pixels in the region divided by the division determination unit 204 with a relation to the individual determination results of the defective pixel by the determination unit 206. As a consequence, the number of defective pixels can be presented in addition to the information indicating whether or not the region includes a predetermined number or more of the defective pixels.

The configuration of the apparatus is similar to that of the first exemplary embodiment and a description thereof is thus omitted. Unlike the first exemplary embodiment, a computer program stored in the ROM 107 realizes the following functions in the second exemplary embodiment.

Figure 5A:
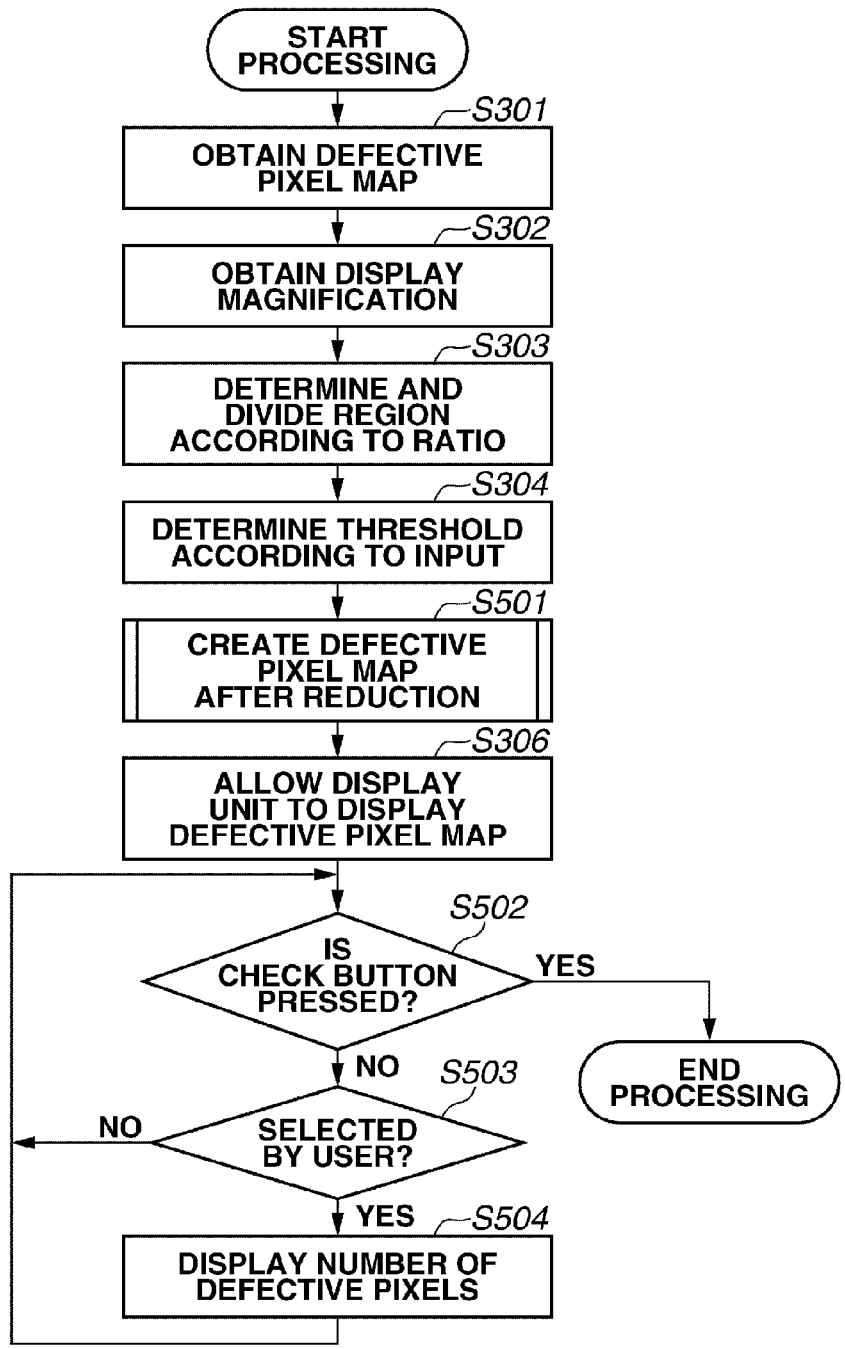
FIG. 5A is a flowchart illustrating a flow of processing according to a second exemplary embodiment of the present invention.

A processing flow executed by the information processing apparatus 102 in FIG. 5A is described below. The same reference numerals as those in the first exemplary embodiment denote the similar processing, and a description thereof is omitted.

In step S501, the determination unit 206 and the creation unit 207 create the defective pixel map after the reduction. The processing in step S501 is described below. Unlike the first exemplary embodiment, the pixel information holds the value of the defective pixel.

In step S502, the display control unit 208 controls the display unit 103 to display the defective pixel map after the reduction, and a user input can be accepted until the user presses a check button on the screen. When the user presses the check button, the display processing ends.

The user operates the mouse 110 to set a mouse cursor on the pixel after the reduction indicating that the region includes the defective pixel on the screen. In step S503, the CPU 109 detects the operation, thereby interpreting the selection of the user. Until the selection, waiting processing is performed.

In the selection with the operation of the mouse cursor using the mouse 110, preferably, the defective pixel map after the reduction is enlarged for easy selection.

In step S504, the display control unit 208 refers to the pixel information of the pixel after the reduction from the storage unit 209 in response to the selection in step S503, and controls the display unit 103 to display the number of defective pixels in the region before the reduction corresponding to the pixel after the reduction. Thus, the defective pixel map after the reduction enables recognition of the number of defective pixels included in the pixel after the reduction.

Figure 5B:
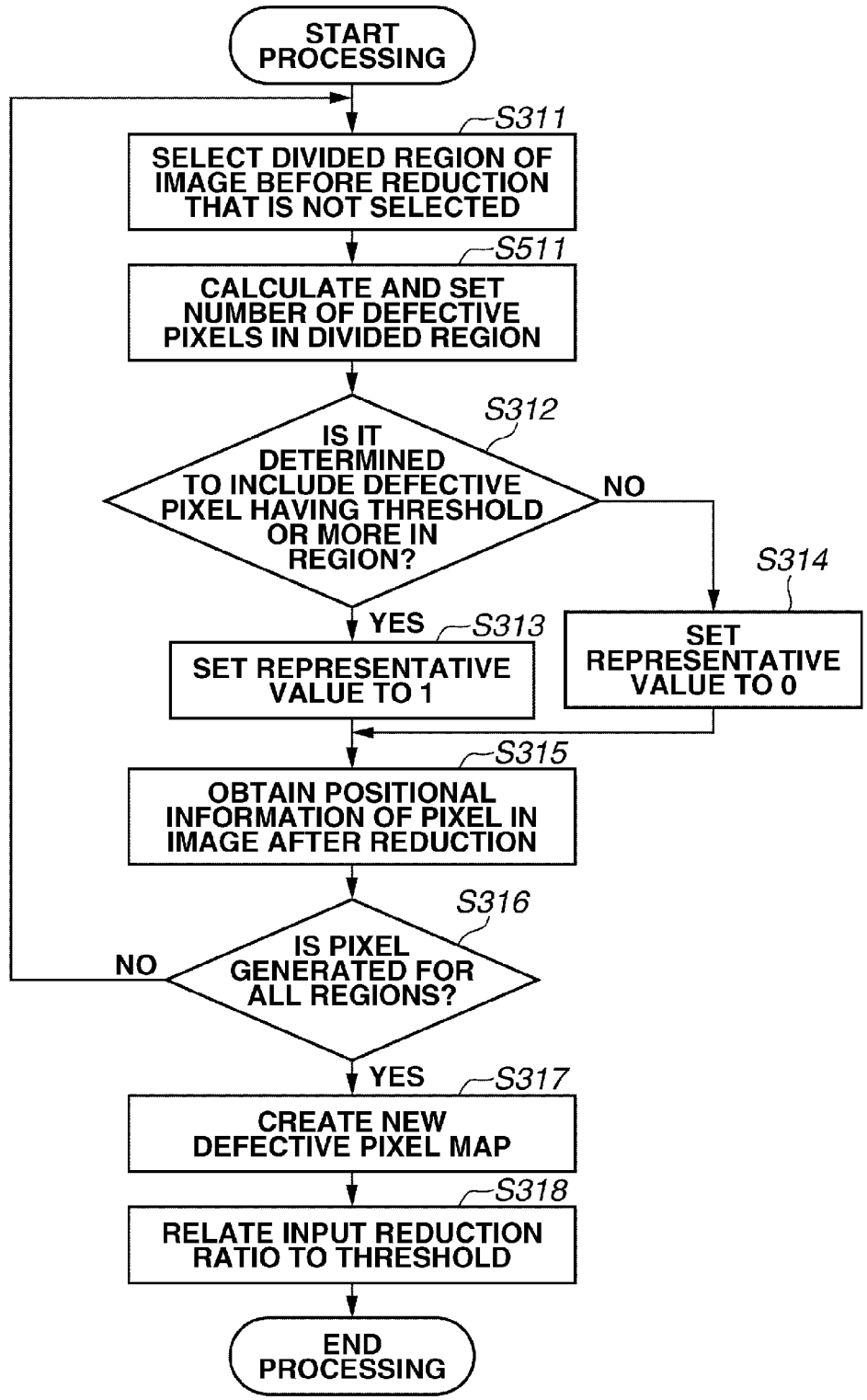
FIG. 5B is a flowchart illustrating a flow of processing according to the second exemplary embodiment of the present invention.

The processing for creating the defective pixel map after the reduction in step S501 is described with reference to a flowchart in FIG. 5B. The pixel information created in the processing has the following format in Table 2.

TABLE 2

| Data Name | Format |
|---|---|
| Pixel Position | 2-dimensional Coordinates (i, j) |
| Representative Value | 1, 0 |
| Number of Defective Pixels | Real |

Unlike the first exemplary embodiment, the number of the defective pixels is related to the individual determination results of the determination unit 206. The number of the defective pixels is a value indicating the number of the defective pixels in the region before the reduction as a determination target of the determination unit 206. In step S311, the number of the defective pixels is calculated for the individual determination results, and the relating operation is set. The number of the defective pixels is calculated by referring to the defective pixel map obtained from the detector 101 as indicated by equation (2).

Equation (2)

$$Dmap(i, j) = \sum_{y=Y_1}^{Y_2} \left( \sum_{x=X_1}^{X_2} (Dmap_0(x, y)) + (X_1 - 1) \cdot |X_1 - i \cdot kDisp| + (X_2 + 1) \cdot |X_2 - i \cdot kDisp| \right) + (Y_1 - 1) \cdot |Y_1 - j \cdot kDisp| + (Y_2 + 1) \cdot |Y_2 - j \cdot kDisp|$$

$$X_1 = \text{ceil}(i \cdot k)$$
$$X_2 = \text{floor}((i + 1) \cdot k)$$
$$Y_1 = \text{ceil}(j \cdot k)$$
$$Y_2 = \text{floor}((j + 1) \cdot k)$$

[Math. 2]

In equation (2), Dmap0 is the defective pixel map before the reduction and is twodimensional data in which the position with the defect is expressed as 1 and the position without the defect is expressed as 0. Dmap is the defective pixel map after the reduction, a function floor (x) is the largest integer that is x or less, a function ceil(x) is the smallest integer that is x or more, and k is the reciprocal of the display magnification KDisp.

With the above-described processing, the storage unit 209 finally stores the defective pixel with the relation to the determination result. Thus, the number of defective pixels is easily referred to. Another processing is similar to that of the first exemplary embodiment.

Figure 6A:
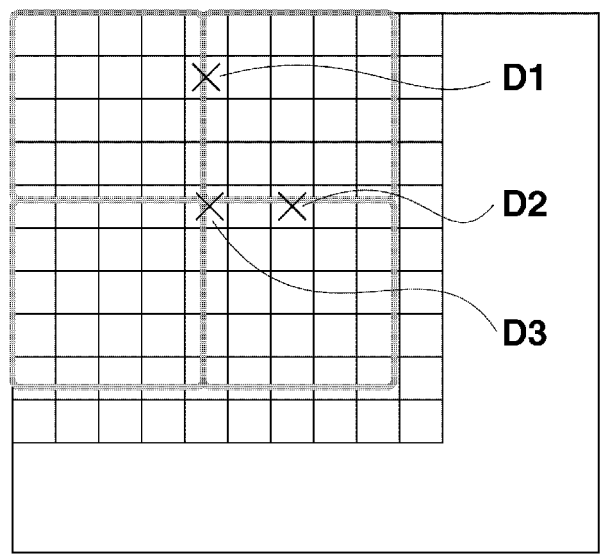
FIG. 6A illustrates a display example of created information according to the second exemplary embodiment.

Referring to FIG. 6A, when a display value is an integer, a defective pixel D1 is influence the pixel for display on the right side larger than the pixel for display on the left side. As a consequence, the pixel for display on the right is counted as a defective pixel. Similarly, a defective pixel D2 influences a defective pixel on the bottom side larger than defective pixel on the upper side. As a consequence, the pixel for display on the bottom is counted as a defective pixel.

A defective pixel D3 influences four pixels for display. Similarly, the pixel for display on the lower right is counted as a defective pixel. When pixels for display affects defective pixels with a similar degree, a rule for counting the pixel, for example, on the left as a defective pixel is determined in advance.

FIG. 6A illustrates the defective pixel map obtained from the detector 101. It is assumed that the defective pixel map is reduced at a reduction ratio of 1/4.25.

Figure 6B:
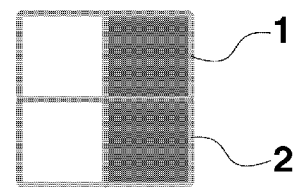
FIG. 6B illustrates a display example of created information according to the second exemplary embodiment.

The display control unit 208 obtains the number of the defective pixels included in the pixel after the reduction by referring to the reduced defective pixel map. FIG. 6B illustrates an example of a display screen that displays the calculated number of defective pixels according to the user selection.

Thus, not only with the density of the pixel after the reduction but also with the value, the number of defective pixels is presented to the user, and the check operation becomes easy. The number of the anomalous pixels may be displayed, instead of the information indicating whether or not the region includes a predetermined number of defective pixels.

Example 3

According to a third exemplary embodiment, the storage unit 209 stores information indicating the position of the defective pixel in the region divided by the division determination unit 204 with a relation to the individual determination results of the defective pixel by the determination unit 206. Consequently, in addition to the information indicating whether or not the region includes a predetermined number of the defective pixels, information on the accurate position of the defective pixel in the image is also presented to the user.

The configuration thereof is similar to that of the first exemplary embodiment and is therefore omitted. Unlike the first exemplary embodiment, a computer program stored in the ROM 107 realizes the following function and processing in the third exemplary embodiment.

Figure 7A:
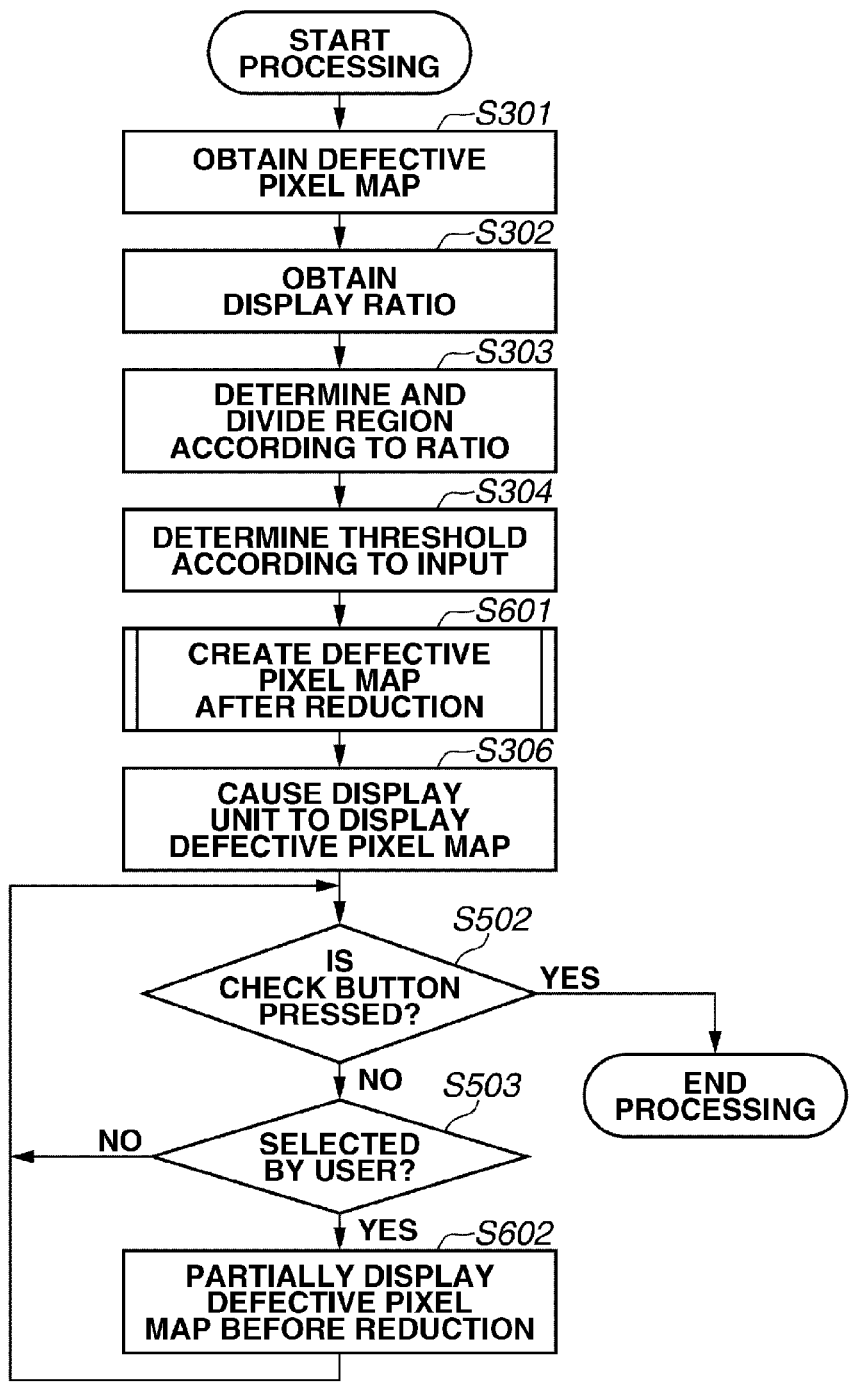
FIG. 7A is a flowchart illustrating a flow of processing according to a third exemplary embodiment of the present invention.

A processing flow executed by the image processing apparatus 102 is described with reference to a flowchart illustrated in FIG. 7A. The similar processing to that of the first exemplary embodiment is not described.

In step S601, the determination unit 206 and the creation unit 207 create a defective pixel map after the reduction. Unlike the first and second exemplary embodiments, the created defective pixel map after the reduction has information on the region of a determination target of the determination unit 206 with a relation to the positional information of the anomalous pixel in the region via the information. The processing is described below.

Figure 8:
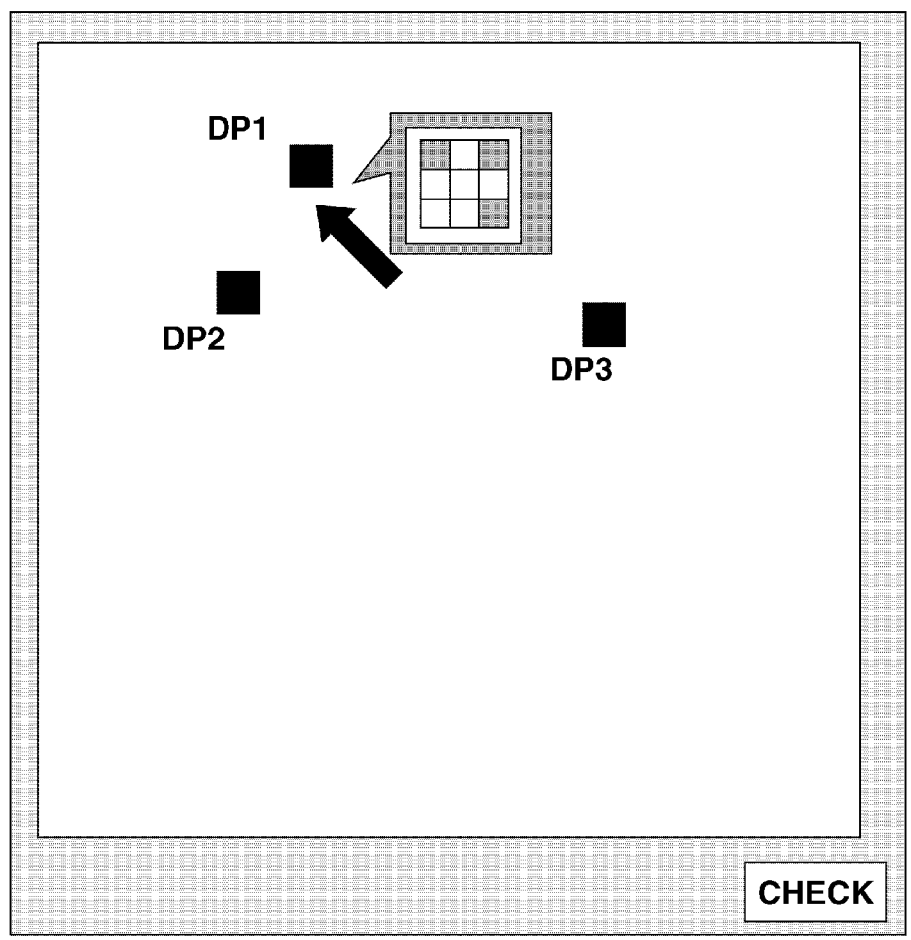
FIG. 8 illustrates a display example of created information according to the third exemplary embodiment.

With the processing to step S306, the display control unit 208 controls the display unit 103 to display the defective pixel map after the reduction. The display unit 103 displays pixels DP1, DP2, and DP3 after the reduction indicating positions of the defective pixel as illustrated in FIG. 8.

The user operates the mouse 110 to set the mouse cursor to the pixel DP1 after the reduction. In response to the input, the CPU 109 interprets that the user selects the pixel DP1 after the reduction (Yes in step S503), and refers to the pixel information corresponding to the pixel DP1 after the reduction stored in the storage unit 209.

With the pixel information, the CPU 109 refers to data on the region of the defective pixel map before the reduction to obtain information on the region of the defective pixel map before the reduction. In step S602, the display control unit 208 controls the display unit 103 to display the obtained information.

Figure 7B:
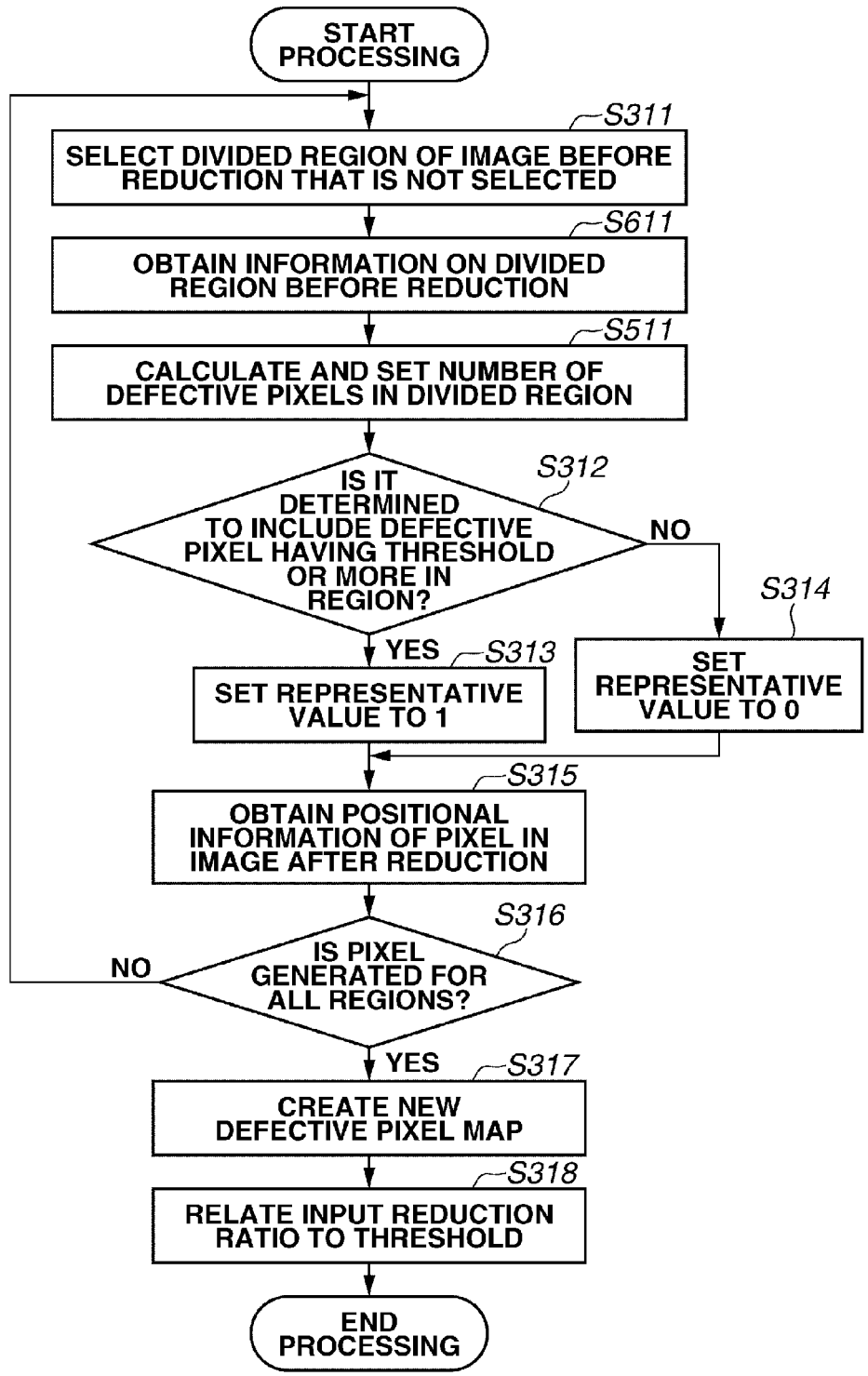
FIG. 7B is a flowchart illustrating a flow of processing according to the third exemplary embodiment of the present invention.

The processing in step S601 for creating the defective pixel map after the reduction with reference to FIG. 7B is described. In the processing, the pixel information created by the creation unit 207 has the following format illustrated in Table 3.

TABLE 3

| Data Name | Format |
|---|---|
| Pixel Position | 2-dimensional Coordinates (i, j) |
| Representative Value | 1, 0 |
| Region in Defective Pixel Map before Reduction | Coordinates (x1, y1) of Upper left Point<br>Coordinates (x2, y2) of Bottom Left Point |

Data on the region of the defective pixel map before the reduction indicates the corresponding region of the pixel after the reduction in the defective pixel map before the reduction. With the data, the storage unit 209 stores the position of the defective pixel in the region corresponding to the pixel after the reduction in the defective pixel map before the reduction, with a relation to the individual determination results.

In step S611, the CPU 109 obtains coordinate values of points on the upper left and lower right in the region based on the division data generated by the division determination unit 204, and stores the obtained coordinate values in the storage unit 209 to generate the pixel information. Another processing is similar to the description according to the first and second exemplary embodiments and is not described.

FIG. 8 illustrates a display example of a screen realized by the display processing in step S902. The user sets the mouse cursor to the pixel DP1 to cut out and display the defective pixel map of the region corresponding to the pixel DP1.

The defective pixel map before the reduction is partly extracted and displayed together with the defective pixel map after the reduction, thereby presenting the number of defective pixels and a positional relationship to the user. The user can confirm the details.

The third exemplary embodiment may use the number of defective pixels with the relation to the pixel information in the second exemplary embodiment, and the number of defective pixels may be displayed. Without showing the information indicating whether or not the region includes a predetermined number of the defective pixels, the defective pixel map before the reduction may indicate the position of the defective pixel in the region corresponding to the pixel after the reduction.

Example 4

According to the fourth exemplary embodiment, it is characterized by emphasis and display of the pixel after the reduction obtained from the region that is determined to include a predetermined number or more of the defective pixels, with respect to the pixel after the reduction obtained from the region that is determined not to include a predetermined number of the defective pixels, in the region divided by the division determination unit 204.

In another viewpoint, the creation unit 207 creates a defective pixel map after the reduction containing pixel values varied depending on the number of defective pixels in order to present the information on the number of defective pixels in the reduced pixel in addition to the display operation according to the first exemplary embodiment.

Since the configuration and processing of the fourth exemplary embodiment are similar to those of the above-described exemplary embodiment, the descriptions thereof are omitted. Unlike the above-described exemplary embodiment, a computer program stored in the ROM 107 realizes the following functions.

In step S306, the display control unit 208 determines a luminance value for displaying the pixel with the following equation (3).

Equation (3)

$$\text{Value}(i, j) = V\max * F\left(\frac{Dmap(i, j)}{Kdisp^2}\right) \quad [\text{Math. 3}]$$

In equation (3), Vmax is a maximum value of the luminance value, i.e., 255, Dmap (i, j) is a number of defective pixels included in the pixel after the reduction as expressed in equation (1), and Kdisp is a reduction ratio.

The detail of a display function is described with reference to FIGS. 9A and 9B. A function F(x) indicates a relationship between a ratio x of the number of the defective pixels to the pixel after the reduction and the display luminance. In the present exemplary embodiment, the function F(x) emphasizes and displays a region including a predetermined number or more of the defective pixels, i.e., a region including the defective pixels with a predetermined number density or more.

Figure 9A:
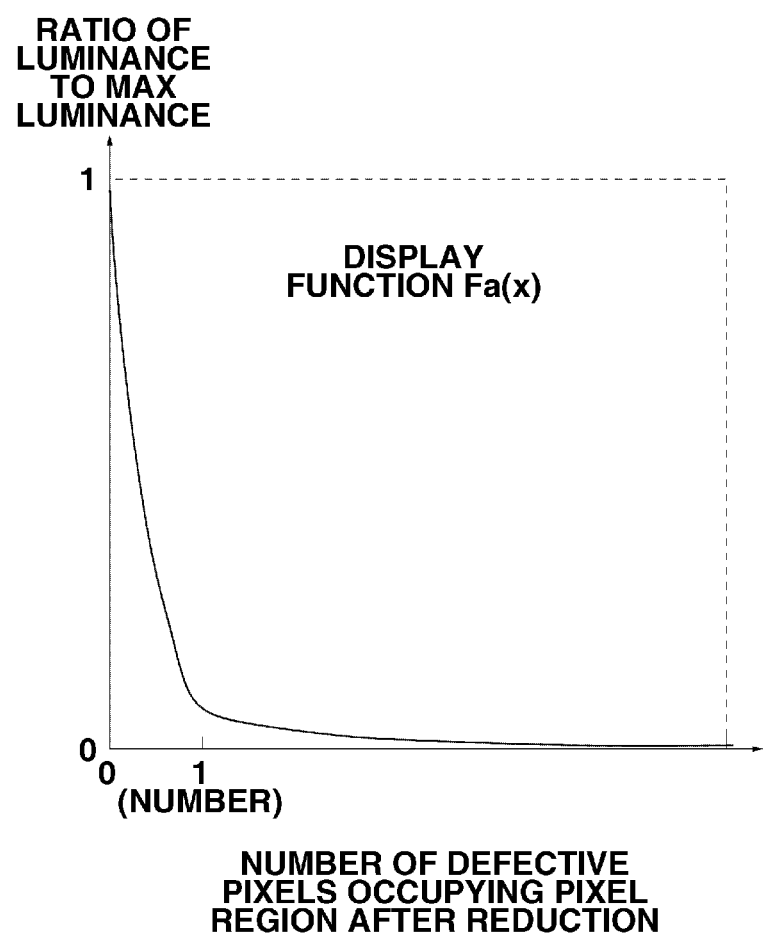
FIG. 9A is a diagram illustrating a relation between a number of defective pixels and a display luminance according to a fourth exemplary embodiment of the present invention.

A display function Fa in FIG. 9A emphasizes and displays a region including at least one defective pixel by greatly reducing the luminance value. For example, the display function Fa can be realized with an exponential function having a predetermined time constant.

The presence or absence of the defective pixel is clearly emphasized and displayed by deriving the display luminance by using the functions, and the difference in number of defective pixels is also displayed. It is possible to visually check the influence degree as how the display pixel is influenced by the defective pixel.

Figure 9B:
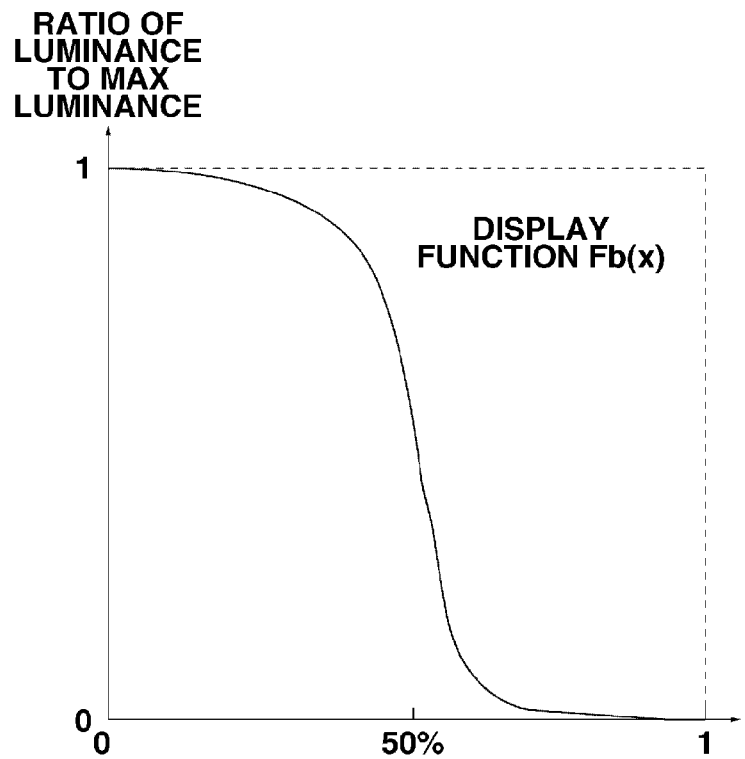
FIG. 9B is a diagram illustrating a relation between a number of defective pixels and a display luminance according to the fourth exemplary embodiment of the present invention.

In a function Fb in FIG. 9B, when the rate of change of the display luminance is reduced in both ranges with small and large ratios of the defective pixels sharing the region divided by the division determination unit 204 and the number density has a predetermined value or more, the pixel is displayed with the lowest luminance value.

The function Fb may be, e.g., a sigmoid function. The derivation of the display luminance by using such functions enables the emphasis and display operation of the pixels after the reduction with a large number density of the defective pixels compared with the pixels after the reduction with a predetermined number density or smaller. Thus, the region influencing the image quality is preferentially checked.

In a case where appropriate correction is extensively difficult whena density of the defective pixel is a certain value or more depending on a correction processing method, the rate of change can be increased near the value. The storage unit 209 stores a defined number density with which the correction is difficult depending on an algorithm used for correcting the defective pixel, thereby setting the number density or number as the threshold by using the defined and stored value as an input.

FIGS. 10A to 10E illustrate created image information and display examples thereof. The creation unit 207 creates the pixel having the pixel value corresponding to the number of defective pixels included in the pixel after the reduction.

Figure 10A:
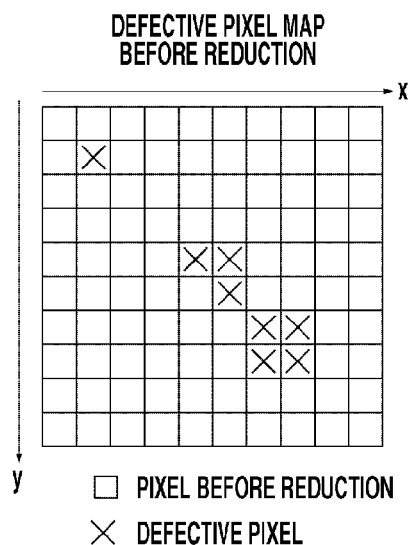
FIG. 10A illustrates a display example of created information according to the fourth exemplary embodiment.
Figures 10B, 10C, 10D:
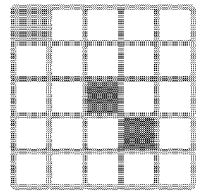
FIG. 10B illustrates a display example of created information according to the fourth exemplary embodiment.
FIG. 10C illustrates a display example of created information according to the fourth exemplary embodiment.
FIG. 10D illustrates a display example of created information according to the fourth exemplary embodiment.

FIG. 10A illustrates an example of the defective pixel map before the reduction. FIG. 10B illustrates the created defective pixel map after the reduction with the reduction ratio of 0.5 as a table having the pixel position and the number of defective pixels corresponding thereto. FIG. 10C illustrates a display example by applying the display function Fa in FIG. 9A. The pixel corresponding to the region including the defective pixel is displayed with dark color and the display pattern changes depending on the number of the defective pixels.

Figure 10E:
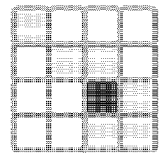
FIG. 10E illustrates a display example of created information according to the fourth exemplary embodiment.

FIG. 10D illustrates a defective pixel map after the reduction with the reduction ratio of 0.4. FIG. 10E illustrates a display example of the defective pixel map after the reduction with the display function Fb being applied to in FIG. 9B.

The emphatic display operation is executed in such a manner that, while displaying the pixel after the reduction at a position (2, 2) where the number density of the defective pixels is 50% or more with the lowest luminance, the pixel after the reduction having the number density less than 50% is displayed with a faint shade. Thus, it is recognized based on the display patterns, whether or not the number density of the defective pixels included in the pixels after the reduction exceeds a predetermined value, and the information on the number of the defective pixels is also displayed.

Example 5

According to the fifth exemplary embodiment, the pixel information is generated based on a number of groups of the defective pixels in the region divided by the division determination unit 204. The user can know the number of groups of the defective pixels greatly influencing the image quality of the defective pixel map reduced based on the pixel information.

The configuration and the processing according to the fifth exemplary embodiment are not described because configuration and the processing are similar to those of the second exemplary embodiment. Unlike the second exemplary embodiment, a computer program stored in the ROM 107 changes to a program for realizing the following function according to the present exemplary embodiment.

Figure 11A:
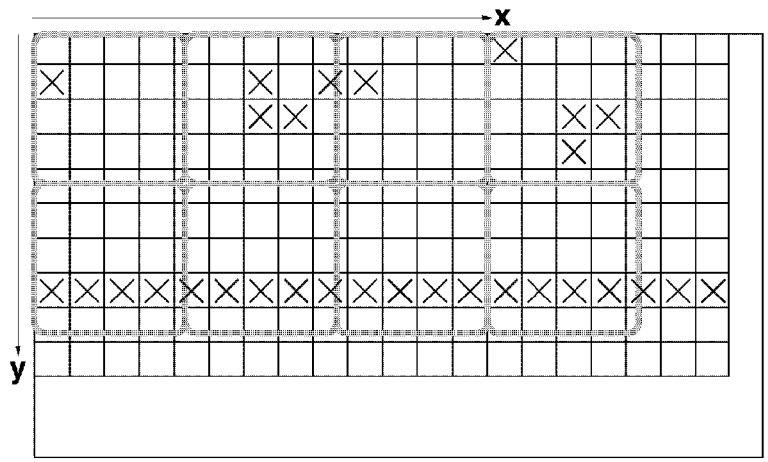
FIG. 11A illustrates created information and a display example thereof according to a fifth exemplary embodiment of the present invention.
Figure 11B:
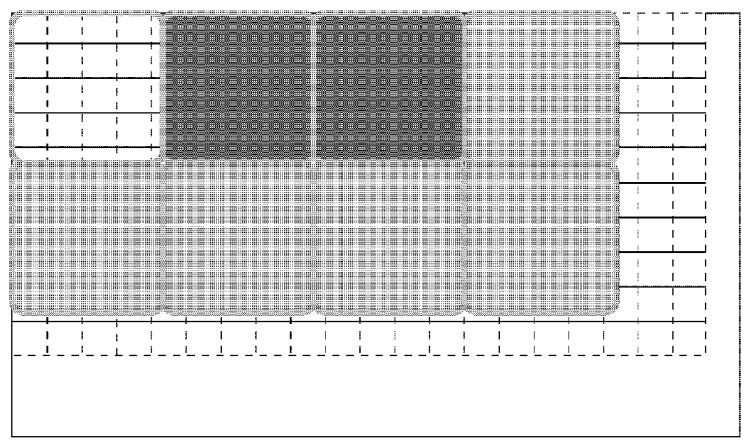
FIG. 11B illustrates created information and a display example thereof according to the fifth exemplary embodiment of the present invention.
Figure 11C:
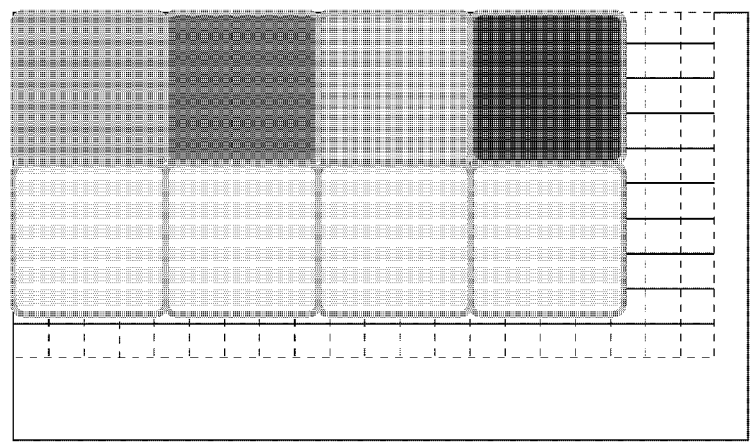
FIG. 11C is a table illustrating the pixels after the reduction according to the fifth exemplary embodiment of the present invention.

The present exemplary embodiment is described with reference to FIGS. 11A to 11C. FIG. 11A illustrates a defective pixel map obtained from the detector 101, assuming the reduction of the defective pixel map with a reduction ratio of 1/4.25.

As a first example, the creation unit 207 generates the pixel information based on the number of groups of the defective pixels included in the region divided by the division determination unit 204. The group of the defective pixels is a set of pixels in which a plurality of the defective pixels are arranged consecutively.

The group of the defective pixels does not include an isolated defective pixel. The isolated defective pixel means that no pixels around the defective pixel are defective pixels.

The creation unit 207 specifies a group of the defective pixels and calculates the number of the pixels included in the region referring to the defective pixel map. Referring to FIG. 11A, when one of neighboring defective pixels is in the third divided region from the right on the uppermost row and is across the second divided region from the right on the uppermost row, the group of defective pixels is determined.

Attention is paid to the group of defective pixels because the influence of the group of defective pixels is greater than that of an isolated defective pixel. The pixel information is generated by setting the number of groups of detective pixels as a pixel value.

The display control unit 208 controls the operation for displaying the image information created based on the pixel information. In this case, the display format changes depending on the pixel value. FIGS. 11B and 11C illustrate display examples of the image information.

The pixel after the reduction having a large number of groups of the defective pixels is displayed with high density. Thus, a portion with a great influence on the image quality is displayed distinctly from another portion, and therefore the influence on the image quality is confirmed.

The determination of the number of groups of the defective pixels may be combined with the configuration for determining the number of defective pixels. When the number of defective pixels is generally determined and if the number of defective pixels is a predetermined number or more, the number of the groups of detective pixels may be determined.

When the region includes a large number of defective pixels, the group of detective pixels is generated with high possibility. The influence on the image quality can be adequately checked by displaying the information with the number of the group of detective pixels on the defective pixel map.

Example 6

As a feature of the present exemplary embodiment, without the determination unit 206 with respect to the configuration of the first exemplary embodiment, pixel information is newly generated using an average of pixel values included in the region divided by a generation unit 1201, the pixel value of the generated pixel is determined by a predetermined threshold of the defective pixel, and the pixel is emphatically displayed.

Figure 12A:
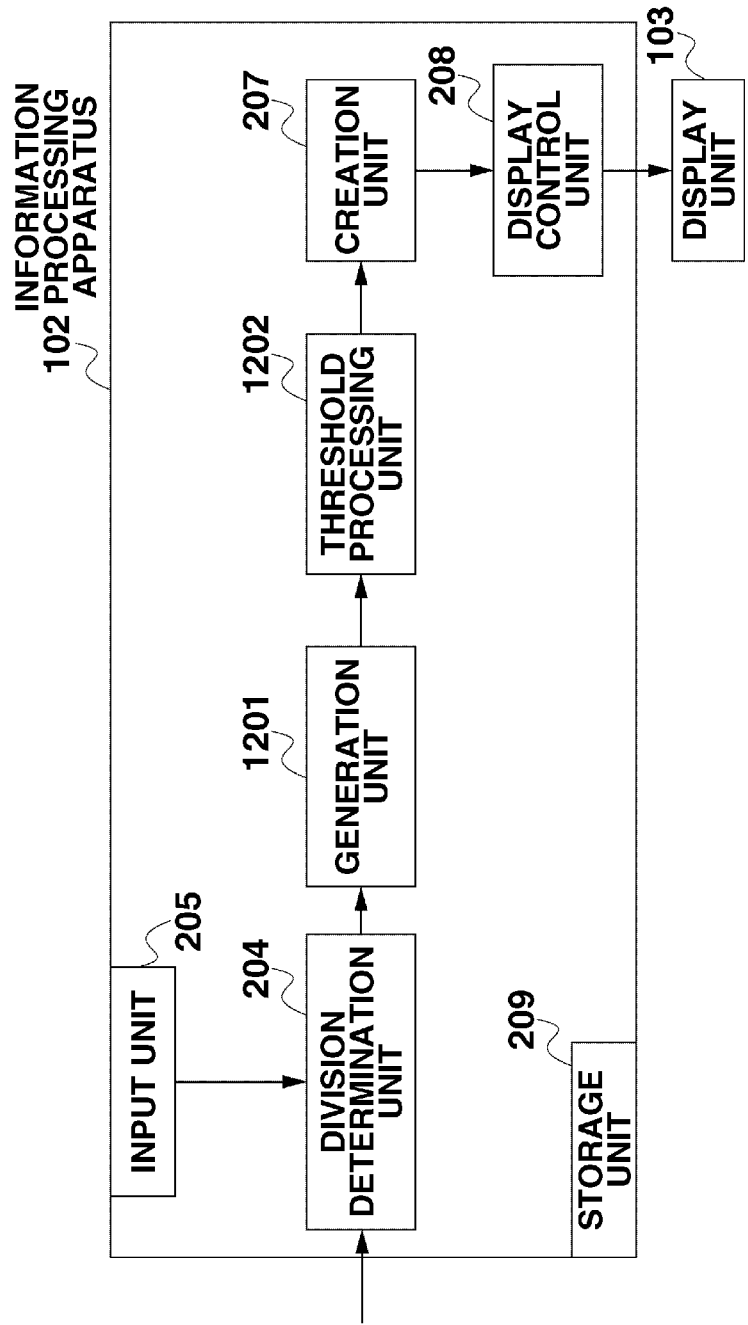
FIG. 12A illustrates functions of an information processing apparatus and a relation therebetween according to a sixth exemplary embodiment of the present invention.

FIG. 12A illustrates a functional block diagram of the information processing apparatus 102. A description is not given on an overlapping portion that is described in the first exemplary embodiment.

The generation unit 1201 may generate the pixel from the divided region, using the method described in the first exemplary embodiment or a well-known algorithm such as a bilinear method or a bicubic method. A threshold processing unit 1202 executes processing on the generated pixels according to the threshold.

Specifically, the pixel having the threshold or more is emphasized with respect to the pixels having values less than the threshold. The threshold corresponds to an input designated by the input unit 205. The pixel value is changed using a sigmoid function having an inflection point near the threshold. Alternatively, binarization processing is performed in such a manner that the pixel value less than the threshold and the pixel value that is the threshold or more is determined to be 0 and 1, respectively.

Figures 12B, 12C:
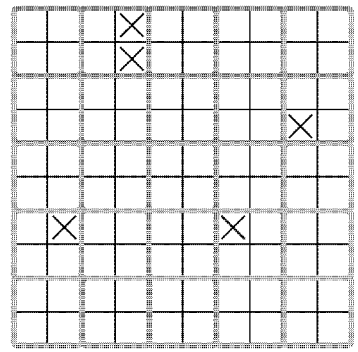
FIG. 12B illustrates the defective pixel map before the reduction according to the sixth exemplary embodiment of the present invention.
FIG. 12C illustrates functions of the information processing apparatus and a relation therebetween according to the sixth exemplary embodiment of the present invention.

FIGS. 12B to 12E illustrate examples. FIG. 12B illustrates the defective pixel map before the reduction. FIG. 12C is a table illustrating the pixels after the reduction generated by the generation unit 1201 with the reduction ratio of 0.5 from the defective pixel map. The generation unit 1201 generates the pixel using the average of the pixel values in the region divided by the division determination unit 204.

Figures 12D, 12E:
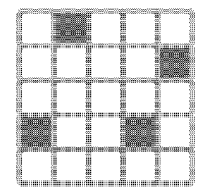
FIG. 12D is a table illustrating the pixel information after the binarization processing of the pixels in FIG. 12C according to the sixth exemplary embodiment of the present invention.
FIG. 12E illustrates a display example of the defective pixel map after the reduction that is reconstructed from the binarized pixels.

At the position of (1, 0), the number of pixels in the region is 4 and the number of the defective pixels is 2, and the pixel value is thus calculated as 0.5. FIG. 12D is a table illustrating the pixel information after the binarization processing of the pixels in FIG. 12C. In the processing, using 0 as a threshold, it is binarized based on whether or not the pixel value is more than 0.

FIG. 12E illustrates a display example of the defective pixel map after the reduction that is reconstructed from the binarized pixels. Without the determination unit 206, the image information is created with the similar effect to that of the first exemplary embodiment by the threshold processing.

According to the first to sixth exemplary embodiments, the case is described in which the present invention is applied to the creation of the reduction display data when reducing and displaying the defective pixel map. The present invention is not limited to the creation of the display data according to the first to sixth exemplary embodiments.

It is possible to apply the present invention to an image, which is obtained by an imaging apparatus that can perform binning for adding and reading outputs from a plurality of pixel circuits with a digital sensor in the imaging apparatus, to create the defective pixel map used in the defective pixel correction.

The case is described in which the defective pixel is selected as an example of the anomalous pixel, and the present invention is applied to the defective pixel. However, the present invention is not limited to these examples. The present invention can be applied to the creation of a reduced anomalous pixel map of another anomalous pixel such as noise extracted using the similar extraction method.

The present invention can be applied not only to the image having a number of pixels more than the number of display pixels of a display, but also to an image in a predetermined display region having a number of pixels more than the number of display pixels of a display region thereof.

Although the present invention is applied to the reduction of the defective pixel map in the above-described exemplary embodiments, the present invention is not limited to this. For example, the present invention can be applied to the image including defective pixels.

With respect to an image having a subject image and defective pixels, the pixel information of the defective pixels may be lost in another image information with the reduction processing of the conventional method. According to the present invention, the determination unit is provided to determine whether or not the image includes the defective pixel. Therefore, it is particularly advantageous under the above-described situation because the information on the defective pixels can be effectively stored.

According to the above-described exemplary embodiments, the detector 101 includes the anomalous pixel extraction unit 202 and the correction unit 203 that corrects the anomalous pixel. However, the present invention is not limited to this, and the information processing apparatus 102 may include the extraction unit or the correction unit.

The program that realizes the functions according to the above-described exemplary embodiments may be supplied to the information processing apparatus or system via a network or storage medium. In this case, obviously, the present invention is constructed by an apparatus or system for storing, reading, and executing the supplied program, the program, or a storage medium.

Further, the software mainly realizes the above-described exemplary embodiments of the present invention. However, the present invention is not limited to this, and it is easy for a well-known person in the technological field of the present invention to implement the functional block by a circuit and realize the functional block by hardware. In the exemplary embodiments, only a part of the functional blocks executed by performing the program may be implemented as a dedicated image processing board.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-224830 filed Sep. 29, 2009, which is hereby incorporated by reference herein in its entirety.

The invention claimed is:

1. An information processing apparatus comprising:
   a determination unit configured to determine whether or not a divided region in an image includes a predetermined number of anomalous pixels;
   a creation unit configured to create information indicating the determination result for the divided region;
   a storage unit configured to store information indicating at least one of a number of the anomalous pixels included in the divided region of the image and a position thereof associated with information indicating the determination result; and
   a display control unit configured to cause a display unit to display the created information as a first image indicating whether or not an anomalous pixel is included in the divided region, and an anomalous pixel map as a second image indicating a position of an anomalous pixel included in the divided region, the anomalous pixel map including pixels two-dimensionally arranged, each having one of a first value and a second value, the first value indicating that a pixel having the first value is an anomalous pixel and the second value indicating that a pixel having the second value is not an anomalous pixel.

2. The information processing apparatus according to claim 1, wherein the display control unit is configured to cause a display unit to display the number of the anomalous pixels included in the divided region.

3. The information processing apparatus according to claim 1, wherein the determination unit, when the divided region includes a part of one anomalous pixel, executes a determination according to the part of the anomalous pixel.

4. The information processing apparatus according to claim 1, wherein the determination unit is configured to determine whether or not each of divided regions in an image includes the predetermined number of anomalous pixels, the information processing apparatus further comprising:
a designation unit configured to designate a number density of the anomalous pixel; and
a calculation unit configured to calculate the number of the divided regions based on the designated number density and the number of the pixels included in each of the divided regions.

5. The information processing apparatus according to claim 1, further comprising:
an input unit configured to input magnification for displaying an anomalous pixel map; and
a determination unit configured to determine a size of the divided region based on the input magnification.

6. The information processing apparatus according to claim 5, wherein the determination unit determines the divided region as a region having a number of pixels arranged in horizontal and vertical directions based on the input magnification.

7. The information processing apparatus according to claim 1, wherein the anomalous pixel is a defective pixel.

8. The information processing apparatus according to claim 1, wherein the display control unit is configured to cause a display unit to display the created information as an image of a reduced anomalous pixel map and to cause the display unit to display an image indicating the position of the anomalous pixels included in the divided region.

9. The information processing apparatus according to claim 1, further comprising a correction unit configured to correct the defective pixel in an image using the information indicating the determination result, wherein the image is obtained by an imaging apparatus that can perform binning for adding and reading outputs from a plurality of pixel circuits in a digital sensor in the imaging apparatus.

10. An imaging system comprising:
an imaging unit configured to obtain an image by converting light into an electrical signal;
an extraction unit configured to extract an anomalous pixel from the obtained image;
a determination unit configured to determine whether or not a divided region in the image includes a predetermined number of the anomalous pixels;
a creation unit configured to create information indicating the determination result for divided region;
a storage unit configured to store information indicating at least one of a number of the anomalous pixels included in the divided region of the image and a position thereof associated with information indicating the determination result; and
a display unit configured to display the created information as a first image indicating whether or not an anomalous pixel is included in the divided region, and an anomalous pixel map as a second image indicating a position of an anomalous pixel included in the divided region, the anomalous pixel map including pixels two-dimensionally arranged, each having one of a first value and a second value, the first value indicating that a pixel having the first value is an anomalous pixel and the second value indicating that a pixel having the second value is not an anomalous pixel.

11. An information processing method comprising:
determining, using a processor, whether or not a divided region in an image includes a predetermined number of anomalous pixels;
creating, using a processor, information indicating the determination result for the divided region;
storing, using a processor, on a memory, information indicating at least one of a number of the anomalous pixels included in the divided region of the image and a position thereof associated with information indicating the determination result; and
causing a display unit to display the created information as a first image indicating whether or not an anomalous pixel is included in the divided region, and an anomalous pixel map as a second image indicating a position of an anomalous pixel included in the divided region, the anomalous pixel map including pixels two-dimensionally arranged, each having one of a first value and a second value, the first value indicating that a pixel having the first value is an anomalous pixel and the second value indicating that a pixel having the second value is not an anomalous pixel.

12. A non-transitory computer readable medium storing a program that causes a computer to execute a method of claim 11.

13. An information processing apparatus comprising:
a determination unit configured to determine whether or not each of divided regions in an image includes a predetermined number of anomalous pixels;
a creation unit configured to create information indicating the determination result for each of the divided regions;
a storage unit configured to store information indicating at least one of a number of the anomalous pixels included in each of the divided regions of the image and a position thereof associated with information indicating the determination result;
a designation unit configured to designate a number density of the anomalous pixel; and
a calculation unit configured to calculate the number of the divided regions based on the designated number density and the number of the pixels included in each of the divided regions.

14. An information processing apparatus comprising:
a determination unit configured to determine whether or not a divided region in an image includes a predetermined number of anomalous pixels;
a creation unit configured to create information indicating the determination result for the divided region;
a storage unit configured to store information indicating at least one of a number of the anomalous pixels included in the divided region of the image and a position thereof associated with information indicating the determination result;
an input unit configured to input magnification for displaying an anomalous pixel map; and
a determination unit configured to determine a size of the divided region based on the input magnification.

15. The information processing apparatus of claim 14, wherein the determination unit determines the divided region as a region having a number of pixels arranged in horizontal and vertical directions based on the input magnification.

* * * * *